United States Patent [19]

Mills et al.

[11] 4,312,953

[45] Jan. 26, 1982

[54] OLIVE-GREEN GLASS COMPOSITIONS

[75] Inventors: Harry N. Mills; John Jasinski, both of Toledo, Ohio

[73] Assignee: Owens-Illinois, Inc., Toledo, Ohio

[21] Appl. No.: 229,439

[22] Filed: Jan. 29, 1981

[51] Int. Cl.$^3$ .......................... C03C 3/04; C03C 3/30

[52] U.S. Cl. ........................................ 501/71; 501/72

[58] Field of Search .......................................... 106/52

[56] References Cited

U.S. PATENT DOCUMENTS

| | | | |
|---|---|---|---|
| 3,003,886 | 10/1961 | Pither | 106/52 |
| 3,326,702 | 6/1967 | Babcock | 106/52 |
| 3,502,454 | 3/1970 | Shonebarger | 106/52 |
| 3,513,003 | 5/1970 | Hammer et al. | 106/52 |
| 3,627,548 | 12/1971 | Hammer et al. | 106/52 |
| 3,837,831 | 9/1974 | Moore | 106/52 |

*Primary Examiner*—O. R. Vertiz
*Assistant Examiner*—Mark Bell
*Attorney, Agent, or Firm*—Richard D. Heberling; Myron E. Click; David H. Wilson

[57] ABSTRACT

Olive-green colored reduced glass compositions are disclosed in which the glass is a soda-lime-silicate glass having $Fe_2O_3$, $S^{-2}$ and $Cr_2O_3$ present in the following approximate ranges in % by weight:

| | |
|---|---|
| $Fe_2O_3$ | 0.1–0.4 |
| $S^{-2}$ | 0.01–0.04 |
| $Cr_2O_3$ | 0.02–0.2 |

The glass is especially adapted for making beer bottles that are pleasing to the eye and are light protective without the use of cobalt.

5 Claims, No Drawings

OLIVE-GREEN GLASS COMPOSITIONS

The present invention relates to olive-green colored reduced glass compositions especially useful as beer bottles and other light protecting glass containers.

It is highly desirable to provide an olive-green colored glass composition expressly adapted for use as a beer bottle. Such olive-green glass must be pleasing to the eye and protect the beer from damage by light. In the past, green colored glass compositions have been used for beer bottles, such glass being either oxidized glass and/or containing cobalt oxide which is not a desirable ingredient for a beer bottle container.

It is an object of the present invention to provide an olive-green reduced glass composition in which the glass is pleasing to the eye and light protective and is a soda-lime-silicate glass having $Fe_2O_3$, $S^{-2}$ and $Cr_2O_3$ present in the following approximate ranges in % by weight,

| | |
|---|---|
| $Fe_2O_3$ | 0.1–0.4 |
| $S^{-2}$ | 0.01–0.04 |
| $Cr_2O_3$ | 0.02–0.2 |

It is an object of the present invention to provide a new use for a light protective olive-green colored reduced glass composition in which the glass is a soda-lime-silicate glass containing about 0.1 to 0.4% by weight of $Fe_2O_3$, about 0.01 to 0.04%, $S^{-2}$, and 0.02 to 0.2% $Cr_2O_3$; the new use comprising the step of:
1. forming a glass beer bottle from the glass to provide an olive-green colored reduced glass beer bottle that is pleasing to the eye and is light protective, and;
2. filling the bottle with beer These and other objects will become apparent from the specification that follows as well as from the appended claims.

The present invention provides an outstanding light protective olive-green colored reduced glass composition that is a soda-lime-silicate glass having in approximate ranges in % by weight the following ingredients:

| | |
|---|---|
| $Fe_2O_3$ | 0.1–0.4 |
| $S^{-2}$ | 0.01–0.04 |
| $Cr_2O_3$ | 0.02–0.2 |

The resultant glass, made by conventional methods is preferably used for beer bottles. The bottles are a pleasing olive-green in appearance and are light protective for the beer.

The preferred and optimum approximate ranges of the $Fe_2O_3$, $S^{-2}$ and $Cr_2O_3$ in the reduced soda-lime-silicate glass are as follows:

| | Preferred Range | Optimum Range |
|---|---|---|
| $Fe_2O_3$ | 0.3 to 0.38 | 0.29 to 0.32 |
| $S^{-2}$ | 0.012 to 0.025 | 0.015 to 0.020 |
| $Cr_2O_3$ | 0.06 to 0.12 | 0.07 to 0.10 |

The outstanding olive-green colored reduced glass composition has generally the following ingredients in approximate % by weight.

| Ingredients | % By Weight |
|---|---|
| $SiO_2$ | 66–74 |
| $Al_2O_3$ | 1.4–6.5 |
| $TiO_2$ | 0.01–0.15 |
| CaO | 8.9–12.5 |
| MgO | 0.10–4.0 |
| $K_2O$ | 0.20–2.7 |
| $Na_2O$ | 12.0–14.5 |
| MnO | 0.01–0.04 |
| FeO | 0.05–0.35 |
| $Fe_2O_3$ | 0.1–0.4 |
| $S^{-2}$ | 0.01–0.04 |
| $Cr_2O_3$ | 0.02–0.2 |

Excellent results have been obtained by the following preferred olive-green colored reduced soda-lime-silicate glass:

| Ingredients | Approximate % By Weight |
|---|---|
| $SiO_2$ | 71.85 |
| $Al_2O_3$ | 2.21 |
| $TiO_2$ | 0.05 |
| CaO | 9.68 |
| MgO | 1.04 |
| SrO | 0.16 |
| $Na_2O$ | 14.13 |
| $K_2O$ | 0.41 |
| FeO | 0.26 |
| $Fe_2O_3$ | 0.31 |
| $S^{-2}$ | 0.019 |
| $Cr_2O_3$ | 0.10 |

The olive-green colored reduced glasses are made conventionally with an effective amount of a reducing agent such as carbon, sugar, starch or aluminum metal, the general range being about 0.02 to 0.2% by weight of the raw batch material and preferably about 0.03 to 0.1%. Carbon is the preferred reducing agent and can be mixed with sand using about 1 part by weight of carbon to about 3 parts by weight of sand.

Effective color control of the glass composition can be accomplished by using various amounts of $Cr_2O_3$ as specified herein. Also color variations of the glass can be made by varying the levels of chromium, iron and state of reduction (presence of sulfur as sulfide).

The olive-green glass compositions of the present invention provides an olive-green color without the use of multiple expensive colorants, such as cobalt, nickel or hexavalent chromium. By using an iron sulfide chromium colorant an olive-green glass is produced and fabricated into outstanding beer bottles, the olive-green glass has the light protective characteristics of amber. The olive-green glass is superior to that of emerald green or U.V. absorbing green glass in its light protective properties.

The following example illustrates the invention and is not intended to be limiting in any way.

EXAMPLE

An olive-green colored reduced glass composition according to the present invention was made from glass raw batch materials as follows in approximate weight in pounds:

| Batch Materials | Pounds |
|---|---|
| $SiO_2$ (sand) | 3990 |
| Soda Ash | 1438 |
| Aragonite | 954 |

-continued

| Batch Materials | Pounds |
| --- | --- |
| Slag | 306 |
| Feldspar | 462 |
| Salt Cake | 3.5 |
| Iron Scale | 12 |
| Carbon Mix (27.71% by weight of carbon and 72.29% of sand) | 14 |
| Iron chromite | 15.7 |
| Cullet (olive-green colored reduced glass of approximately the same composition) | 1500 |

The raw batch was melted and fired as is well known in the art to produce a glass having the following components in approximate % by weight:

| Component | % By Weight |
| --- | --- |
| $SiO_2$ | 71.85 |
| $Al_2O_3$ | 2.21 |
| $TiO_2$ | 0.05 |
| CaO | 9.68 |
| $M_gO$ | 1.04 |
| SrO | 0.16 |
| $Na_2O$ | 14.13 |
| $K_2O$ | 0.41 |
| FeO | 0.26 |
| $Fe_2O_3$ | 0.31 |
| $S^{-2}$ | 0.019 |
| $Cr_2O_3$ | 0.10 |

The molten glass was formed into excellent olive-green colored beer bottles by conventional methods. The beer bottles were of high quality and pleasing in appearance. The beer bottles had good light transmission properties similar to that of the light protective abilities of amber glass-without the use of cobalt, or nickel, or hexavalent chromium.

Other glass containers can be made of the above olive-green colored glass for light sensitive products such as liquor, wine and pharmaceuticals.

The glass in ⅛ inch thickness had the following colorimetric values:

| DWL, Mu | 575 |
| --- | --- |
| % Purity | 84.2 |
| % Brightness | 33.7 |
| % T-550 | 37.2 |
| % T-400 (2MM) | 4.7 |
| Redness Ratio | 0.83 |

The colorimetric data was measured according to the I.C.I. System, as is known in the art, for instance, in the Handbook of Colorimetry, M.I.T. Press, 1936. In the above data, DWL stands for the dominant wave length and the redness ratio is T-650 (0.125 inch thickness) divided by T-550. An increasing Redness Ratio indicates a "browner" color as decreasing Redness Ratio indicates a "greener" color. As set forth in Hammer and Jasinski U.S. Pat. No. 3,627,548, the I.C.I. colorimetric value system of color notation specifies the color of glasses in terms of brightness, purity and dominant wave length (in millimicrons).

The conditions and procedures for making the molten base glasses are conventional as exemplified in Tooley's "Handbook of Glass Manufacturing", Ogden Publishing Company, New York, New York, 1953 as for example on pages 241-296.

What is claimed is:

1. An olive-green colored reduced glass composition in which the glass is a soda-lime-silicate glass consisting essentially of the following ingredients in approximate % by weight:

| $Fe_2O_3$ | 0.1-0.4 |
| --- | --- |
| $S^{-2}$ | 0.01-0.04 |
| $Cr_2O_3$ | 0.02-0.2 |

2. A glass as defined in claim 1 in which the following ingredients are in approximate % by weight:

| $Fe_2O_3$ | 0.3-0.38 |
| --- | --- |
| $S^{-2}$ | 0.012-0.025 |
| $Cr_2O_3$ | 0.06-0.12 |

3. A glass as defined in claim 1 in which the following ingredients are in approximate % by weight:

| $Fe_2O_3$ | 0.29-0.32 |
| --- | --- |
| $S^{-2}$ | 0.015-0.020 |
| $Cr_2O_3$ | 0.07-0.10 |

4. An olive-green colored reduced glass composition in which the glass consists essentially of in approximate weight % of the following ingredients:

| Ingredients | % By Weight |
| --- | --- |
| $SiO_2$ | 66-74 |
| $Al_2O_3$ | 1.4-6.5 |
| $TiO_2$ | 0.01-0.15 |
| CaO | 8.9-12.5 |
| MgO | 0.10-4.0 |
| $K_2O$ | 0.20-2.7 |
| $Na_2O$ | 12.0-14.5 |
| MnO | 0.01-0.04 |
| FeO | 0.05-0.35 |
| $Fe_2O_3$ | 0.1-0.4 |
| $S^{-2}$ | 0.01-0.04 |
| $Cr_2O_3$ | 0.02-0.2 |

5. An olive-green glass as defined in claim 1 having the following ingredients in approximate % by weight:

| Ingredients | % By Weight |
| --- | --- |
| $SiO_2$ | 71.85 |
| $Al_2O_3$ | 2.21 |
| $TiO_2$ | 0.05 |
| CaO | 9.68 |
| MgO | 1.04 |
| SrO | 0.16 |
| $Na_2O$ | 14.13 |
| $K_2O$ | 0.41 |
| FeO | 0.26 |
| $Fe_2O_3$ | 0.31 |
| $S^{-2}$ | 0.019 |
| $Cr_2O_3$ | 0.10 |

* * * * *